United States Patent
Ofune et al.

(10) Patent No.: US 8,162,487 B2
(45) Date of Patent: Apr. 24, 2012

(54) VIDEO PROJECTOR

(75) Inventors: Kenji Ofune, Higashi (JP); Naoki Kaise, Highashi (JP)

(73) Assignee: Sanyo Electric Co., Ltd., Osaka (JP)

(*) Notice: Subject to any disclaimer, the term of this patent is extended or adjusted under 35 U.S.C. 154(b) by 268 days.

(21) Appl. No.: 12/433,230

(22) Filed: Apr. 30, 2009

(65) Prior Publication Data

US 2009/0278999 A1    Nov. 12, 2009

(30) Foreign Application Priority Data

May 9, 2008  (JP) ................. 2008-123426

(51) Int. Cl.
*G03B 21/14* (2006.01)
(52) U.S. Cl. ........................... 353/70; 353/69
(58) Field of Classification Search ............. 353/69–76, 353/101, 121; 345/647; 348/746
See application file for complete search history.

(56) References Cited

U.S. PATENT DOCUMENTS

| | | | | |
|---|---|---|---|---|
| 6,592,228 B1 * | 7/2003 | Kawashima et al. | ......... | 353/101 |
| 7,093,940 B2 * | 8/2006 | Kubo et al. | ..................... | 353/69 |
| 7,484,855 B2 * | 2/2009 | Kobayashi et al. | .......... | 353/122 |
| 2009/0002510 A1 | 1/2009 | Uchihashi et al. | | |

FOREIGN PATENT DOCUMENTS

| | | |
|---|---|---|
| CN | 101335832 | 12/2008 |
| JP | 2005-123669 | 5/2005 |
| JP | 2007-215029 | 8/2007 |

\* cited by examiner

*Primary Examiner* — Francis M Legasse, Jr.
*Assistant Examiner* — Jerry Brooks
(74) *Attorney, Agent, or Firm* — Occhiuti Rohlicek & Tsao LLP (57) ABSTRACT

A video projector includes a display device which receives an image signal and generates image light projected onto a projection surface. A scaling processor scales the input image signal. An OSD processor generates and corrects an adjustment pattern image in accordance with a correction instruction on the projection surface. An image signal synthesizer combines the image signal processed by the scaling processor with an OSD image signal generated and corrected by the OSD processor to generate a combined image signal. A trapezoidal distortion corrector performs trapezoidal distortion correction on the combined image signal from the image signal synthesizer based on the correction of the adjustment pattern image on the projection surface. The adjustment pattern image generated by the OSD processor includes a reference quadrangle pattern and downsized quadrangle patterns, which are reduced in size from the reference quadrangle pattern.

8 Claims, 6 Drawing Sheets

VIDEO PROJECTOR

CROSS-REFERENCE TO RELATED APPLICATIONS

This application is based upon and claims the benefit of priority from prior Japanese Patent Application No. 2008-123426, filed on May 9, 2008, the entire contents of which are incorporated herein by reference.

BACKGROUND OF THE INVENTION

The present invention relates to a video projector, and more particularly, to a video projector that allows a user to perform trapezoidal distortion correction while viewing an image projected onto a projection surface.

Video projectors are used in various types of facilities, such as home theaters, conference rooms, classrooms, training rooms, amusement halls, exhibition halls, and studios, to project images generated by a computer and the like or images recorded on a recording medium, such as an optical disc or a magnetic tape, onto a projection surface such as a screen.

A video projector is designed so that when arranged directly in front of a projection surface, that is, when an optical axis of the video projector is orthogonal to the projection surface, a rectangular projection image having the desired aspect ratio is projected on the projection surface with a size corresponding to the distance from the video projector to the projection surface (projection distance). However, since a video projector can be used in various locations, the video projector may not be arranged directly in front of the projection surface. Such a case results in diagonal projection and distorts the projected image. This distortion is referred to as trapezoidal distortion or Keystone distortion.

A typical video projector includes a display device (e.g., LCD panel), which modulates light from a light source. When the video projector is arranged directly in front of the projection surface, the display device is provided with an image signal that has been processed so that a rectangular projection image having a predetermined aspect ratio is shown with a size that is in accordance with the projection distance. Trapezoidal distortion caused by diagonal projection is normally corrected by correcting the image signal provided to the display device. Such correction is performed when it is difficult to change the location of the projector or screen.

Mainly two types of trapezoidal distortion correction are known in the prior art. The first type of correction is referred to as an aspect ratio-oriented mode, which is a trapezoidal distortion correction process that keeps the aspect ratio of a projection image constant (refer to Japanese Laid-Open Patent Publication No. 2005-123669). The aspect ratio-oriented mode is used when the adjustment direction is known. The aspect ratio-oriented mode is advantageous when the projector is misaligned with the projection surface in the upward direction or downward direction but not in a lateral direction (in this case, the diagonal direction extends in the vertical direction) or when the projector is misaligned with the projection surface in the lateral direction but not in the upward or downward direction (in this case, the diagonal direction extends in the horizontal direction). For example, if the video projector is used when diagonal projection occurs in the upward direction, the shape of the projected image expands in the vertical direction, and the lateral dimensions of the projected image increases at upper positions. When correcting such trapezoidal distortion, to maintain the desired aspect ratio of the projected image, the vertical dimensions of the projected image prior to correction are reduced by a uniform magnification. As for the horizontal direction, the plurality of horizontal lines forming the projected image prior to correction are reduced or enlarged in length by different magnifications. In this case, the trapezoidal distortion correction amount is directly determined in accordance with the diagonal projection angle.

The second type of correction is referred to as a trapezoidal distortion correction mode oriented to the image displayed on the projection surface (Japanese Laid-Open Patent Publication No. 2007-215029). In this process, the aspect ratio is not restrained in strict terms. Referring to FIGS. 5(a) to 5(d), a display device 1 such as an LCD panel includes a displayable region 2. An offset region 3 in which an image is not displayed is set around the displayable region 2. The region for a projected image is enlarged to fit into the entire displayable region 2. Then, a reference quadrangle pattern is formed by a frame, which extends along the periphery of the enlarged image region, or four corner portions 2a to 2d of the frame. The reference quadrangle pattern serves as an adjustment pattern image 4, which is for adjusting a projection area. The adjustment pattern image 4 is projected onto a projection surface 5 such as a screen and corrected to determine the projection area of the projection surface 5 and the display device 1 and obtain coordinates of the projection area on the display device 1. Deformation parameters are calculated based on the determined projection area, and the image signal is corrected with the calculated deformation parameters.

SUMMARY OF THE INVENTION

When a video projector 6 is arranged directly in front of the projection surface 5, the adjustment pattern image 4 is displayed on the projection surface with the aspect ratio that is set beforehand for the video projector 6 and with a size that is in accordance with the distance between the video projector 6 and the projection surface 5 (projection distance). However, for diagonal projection, the adjustment pattern image 4 is projected onto the projection surface 5 in a state distorted in the vertical direction or horizontal direction (refer to FIG. 5(a)). Therefore, in this correction, the user performs operations for generating a correction command to move the four corner portions 4a to 4d (corresponding to four corner portions 2a to 2d of the image region on the display device 1) of the adjustment pattern image 4, which is displayed on the projection surface 5 in a distorted state, so that the adjustment pattern image 4 becomes rectangular (refer to FIG. 5 (c)). The projection area 7 on the projection surface 5 is determined by correcting the positions of the corner portions 2a to 2d on the display device 1 in accordance with the movement of the corner portions 4a to 4d on the projection surface 5 (refer to FIGS. 5(c) and 5(d)).

If there is enough space in the projection surface 5 and in the offset region 3 of the display device 1 for changing the position of the projection area 7 so as to correct the positions of the four corner portions 4a to 4d and form a rectangle with the corner portions 4a to 4d, a digital shift process is performed in accordance with a user's position shifting command for shifting the displayable region 2 on the display device 1. Such shifting of the displayable region 2 adjusts the display position on the projection surface 5, that is, the position of the projection area 7.

After determining the projection area 7 on the projection surface 5, the projector 6 obtains coordinates for the displayable region 2 that are in correspondence with the determined projection area to calculate deformation parameters used to correct the image signal before the signal is provided to the display device. The image signal undergoes trapezoidal distortion correction in accordance with the deformation parameters.

In the trapezoidal distortion correction process mode oriented to the image displayed on the projection surface of the '029 publication, the shape, size, and position of the projection area 7 may be set with a certain amount of freedom as described above. Although the user has to operate the video projector 6 in the trapezoidal distortion correction process mode, this trapezoidal distortion correction is simple and can be performed even when the user does not understand how to make adjustments.

Figure 5A:
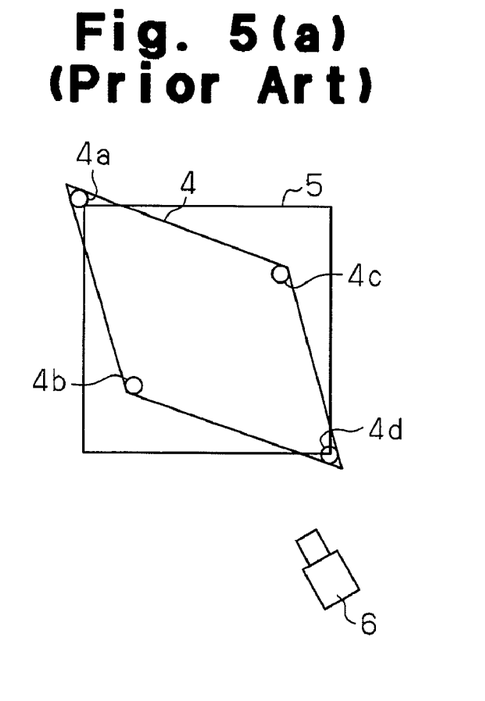
FIG. 5(a) shows a projection surface and an initially projected adjustment pattern image.
Figure 5B:
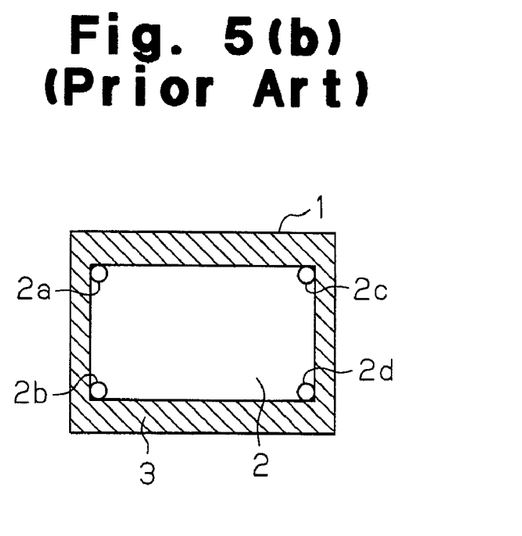
FIG. 5(b) shows a displayable region in a display device.
Figure 5C:
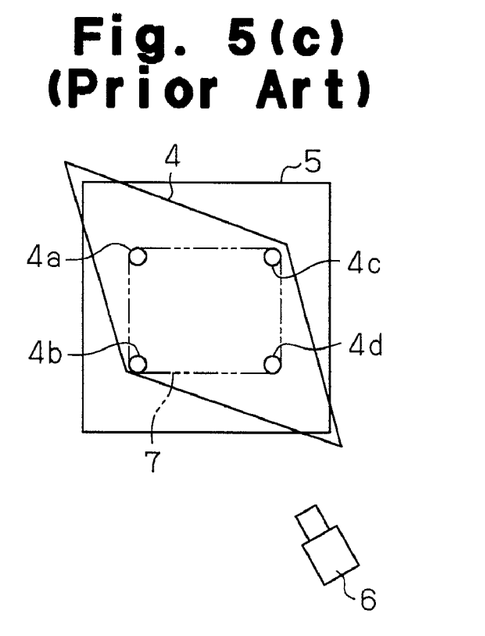
FIG. 5(c) shows a projection surface and a determined projection area.
Figure 5D:
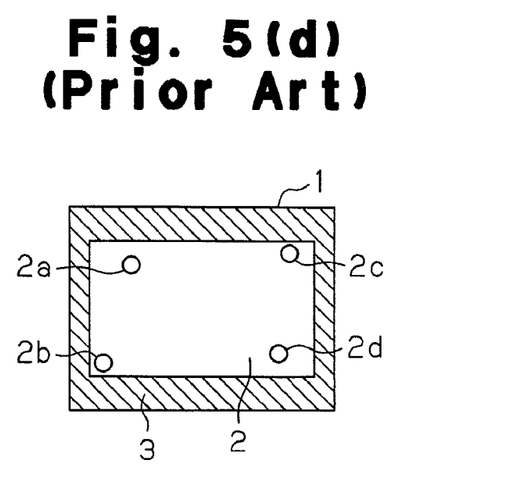
FIG. 5(d) shows coordinates on the display device in correspondence with the determined projection area.
Figure 6:
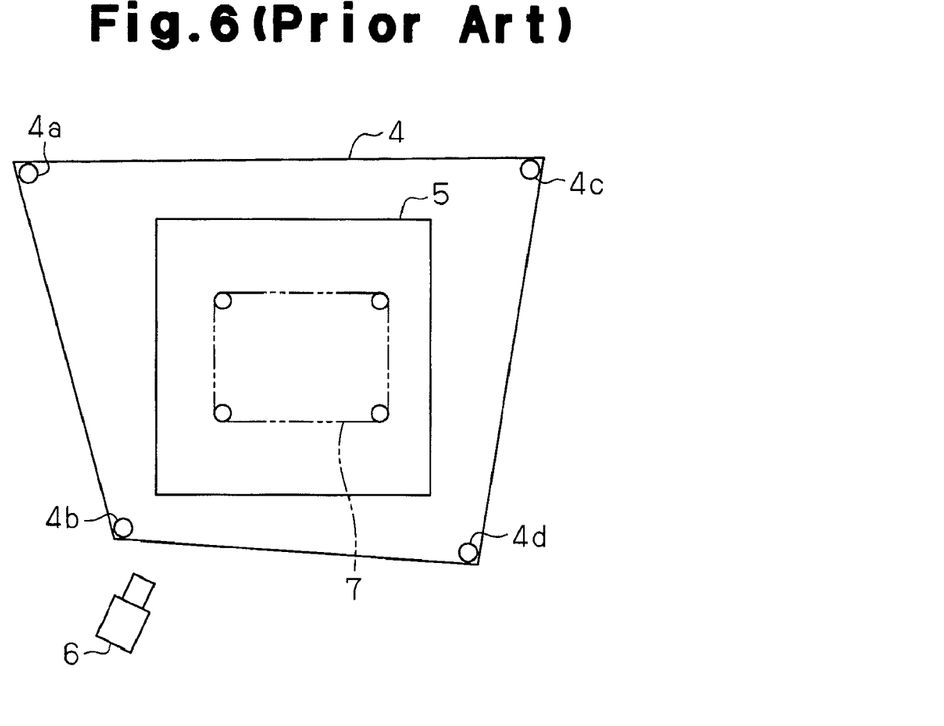
FIG. 6 is a diagram illustrating the problem of the prior art.
Figure 7:
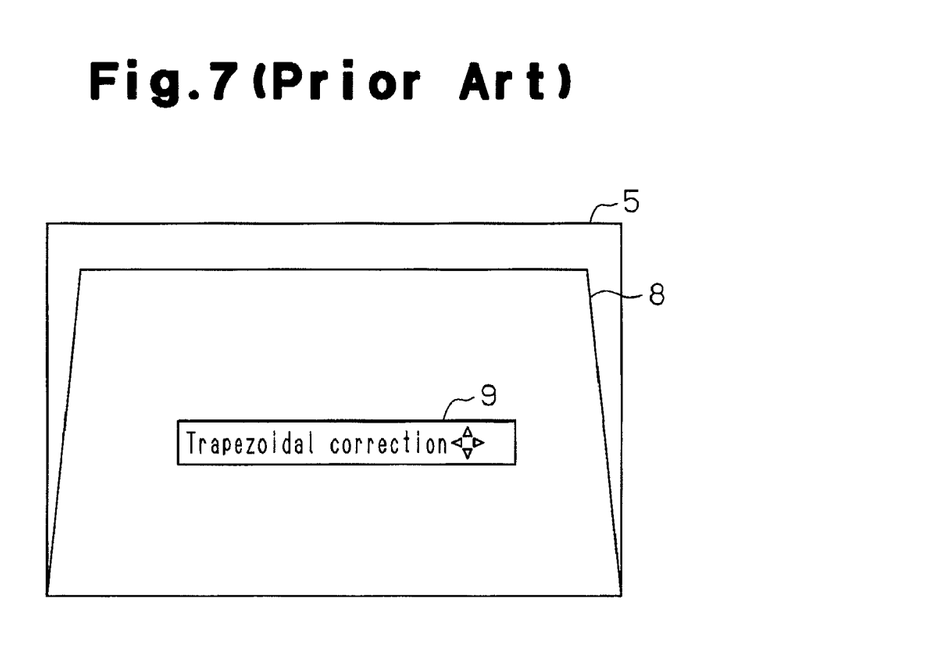
FIG. 7 is a diagram showing a user interface screen for a trapezoidal distortion correction process mode that puts emphasis on the aspect ratio in the prior art.

The trapezoidal distortion correction process mode of the '029 publication determines the position of the projection area 7 by moving the four corner portions 4a to 4d of the adjustment pattern image 4 to any four points located in the adjustment pattern range in correspondence with the projection surface 5 (refer to FIGS. 5(a) and 5(c)). Accordingly, as shown in FIG. 6, if the four corner portions 4a to 4d of the initially projected adjustment pattern image 4 are located outside the projection surface 5, the adjustment pattern image 4 cannot be recognized. In such a case, the presence of the adjustment pattern image 4 may not be recognized even though the adjustment pattern image 4 is projected in a distorted state and thus extends out of the projection surface 5. This hinders trapezoidal distortion correction. In this aspect, the aspect ratio-oriented mode, namely, the trapezoidal distortion correction process mode oriented to the aspect ratio increases or decreases the trapezoidal distortion correction amount in accordance with the angular increase or decrease in the vertical or horizontal direction. Therefore, as shown in FIG. 7, in this mode, trapezoidal distortion may be corrected just by displaying an on-screen display (OSD) menu 9 in the center of the projection image 8. The OSD adjustment menu 9 would not become greatly spaced apart from the projection surface 5 such that it becomes discernible.

In a video projector that performs trapezoidal distortion correction putting emphasis on the image displayed on a projection surface, it is an object of the present invention to allow improved trapezoidal distortion correction control to be performed.

One aspect of the present invention is a video projector including a display device which receives an image signal, performs optical modulation on light emitted from a light source based on the image signal, and generates optically modulated image light to be projected onto a projection surface. A scaling processor performs a scaling process on the input image signal. An OSD processor generates an adjustment pattern image and corrects the adjustment pattern image in accordance with a correction instruction on the projection surface. An image signal synthesizer combines the image signal processed by the scaling processor with an OSD image signal generated and corrected by the OSD processor to generate a combined image signal. A trapezoidal distortion corrector performs trapezoidal distortion correction on the combined image signal from the image signal synthesizer based on the correction of the adjustment pattern image on the projection surface. The adjustment pattern image generated by the OSD processor includes a reference quadrangle pattern and a plurality of downsized quadrangle patterns of different sizes. The reference quadrangle pattern has the same shape as a displayable region on the display device and includes four corner portions. The downsized quadrangle patterns are reduced in size from the reference quadrangle pattern by a magnification of one or less.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIGS. 5(a) to 5(d) are diagrams illustrating trapezoidal distortion correction in the prior art, in which

DETAILED DESCRIPTION OF THE PREFERRED EMBODIMENTS

A preferred embodiment of a video projector according to the present invention will now be discussed in detail with reference to FIGS. 1 to 4. To avoid redundancy, in FIGS. 1 to 4, like or same reference numerals are given to those components that are the same as the corresponding components in FIGS. 5 to 7.

In the present specification, a quadrangle is defined as a polygon with four sides and four corner portions.

Figure 1:
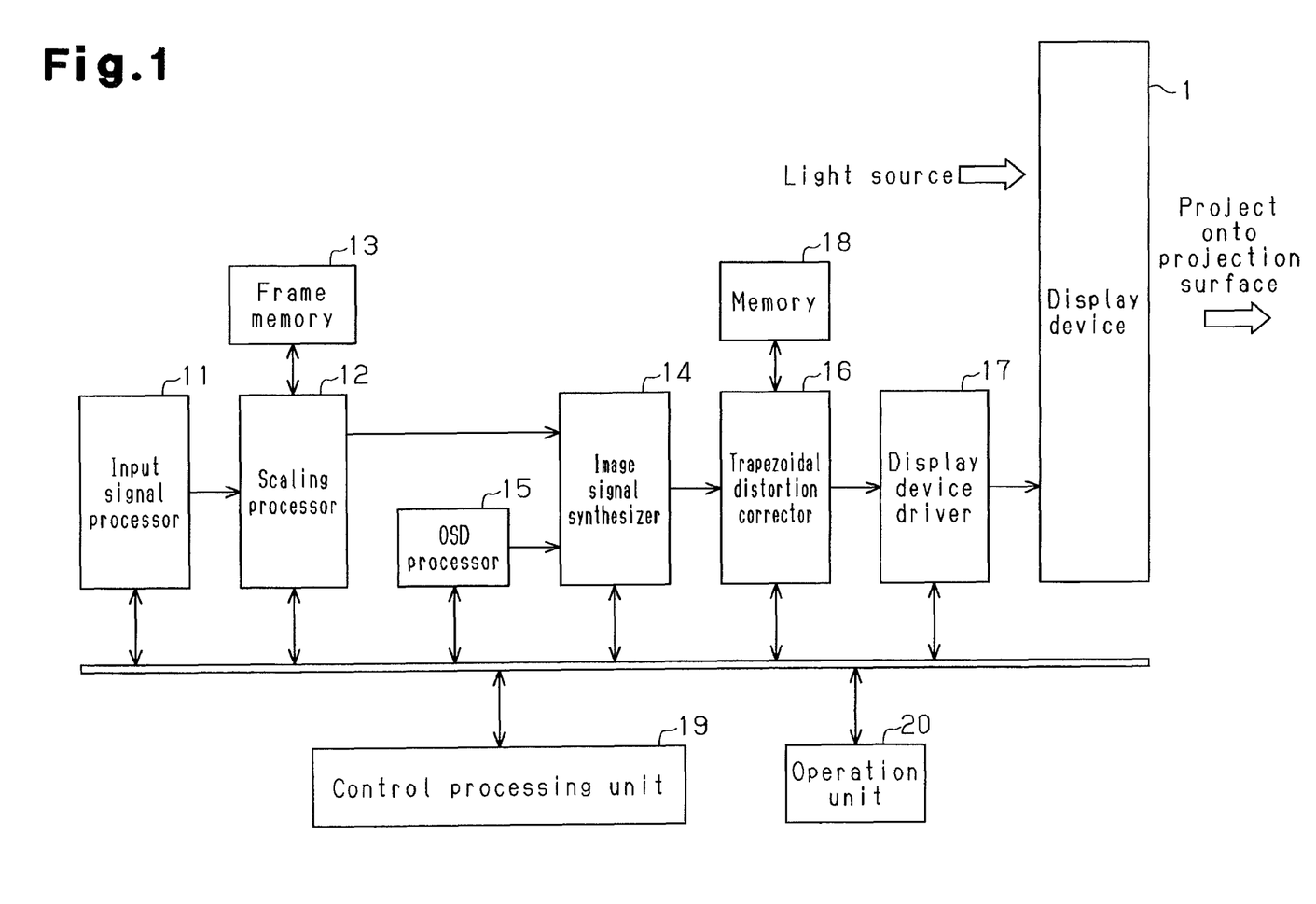
FIG. 1 is a block diagram of a control drive circuit for a three-chip LCD video projector.

The video projector 6 is, for example, a three-chip LCD projector and includes a display device 1, which is an LCD panel. The display device 1 may be referred to as an optical modulation element.

FIG. 1 shows a control drive circuit for the video projector 6. The video projector 6 includes an input signal processor 11, which receives image signals from various types of image reproduction devices (not shown). The input signal processor 11 includes input interfaces, such as an analog I/F, a digital I/F, and a video I/F (not shown), which are applicable for various types of image signals from various types of image reproduction devices, such as a computer, a video recorder, and a television. The input signal processor 11 performs processing, such as A/D conversion and decoding, on a received image signal to convert it into a digital signal, which is provided to a scaling processor 12.

The scaling processor 12 uses a frame memory 13 to scale the received digital signal in accordance with the panel size and performs gamma correction and brightness correction on the scaled image signal. The scaling processor 12 provides the processed digital image signal to an image signal synthesizer 14.

An OSD processor 15 generates an OSD image signal for generating an image displayed on the projection surface 5 in a state superimposed with a projection image. The OSD image signal includes image signals for various types of images such as a menu screen, an operation screen, and an adjustment pattern image 4, which is used for trapezoidal distortion correction. The OSD processor 15 corrects the adjustment pattern image 4 in accordance with a correction command of the adjustment pattern image 4 that is received during trapezoidal distortion correction. The OSD processor 15 then provides the generated or corrected OSD image signal to the image signal synthesizer 14.

To superimpose the OSD image with a projection image, which is based on an image signal from an external image reproduction device, the image signal synthesizer 14 combines a scaled image signal from the scaling processor 12 with an OSD image signal from the OSD processor 15. The image signal synthesizer 14 provides the combined image signal to a trapezoidal distortion corrector 16. The trapezoidal distortion corrector 16 performs trapezoidal distortion correction on the combined image signal and provides an image signal, which has undergone the trapezoidal distortion correction, to a display device driver 17 (in this case, LCD panel driver). A memory 18 is added to the trapezoidal distortion corrector 16 to store information required for trapezoidal distortion correction.

The display device driver 17 converts the trapezoidal distortion corrected image signal from the trapezoidal distortion corrector 16 into a format that is in compliance with the display device 1 and simultaneously generates drive pulses for driving the display device 1. The display device 1 performs optical modulation on light emitted from a light source based on the image signal from the display device driver 17 to generate image light. The display device 1 is, for example, an LCD panel. The image light is emitted from the display device 1 through a projection lens (not shown) to form and display an image on the projection surface 5, which is a screen or the like located at a position separated from the video projector 6 by a predetermined distance.

The control drive circuit of FIG. 1 includes a control processing unit 19. The control processing unit 19 includes a processor for performing calculations, a RAM for storing information obtained through the calculations, and a ROM for storing control programs. The control processing unit 19 controls operation of the entire video projector 6 in accordance with the control programs stored in the ROM.

An operation unit 20 includes switches formed on the main body or remote controller of the video projector 6. The video projector 6 and the OSD processor 15 are driven in accordance with commands from the operation unit 20.

A trapezoidal distortion correction process performed on a projected image by the video projector 6 will now be discussed.

Figure 2:
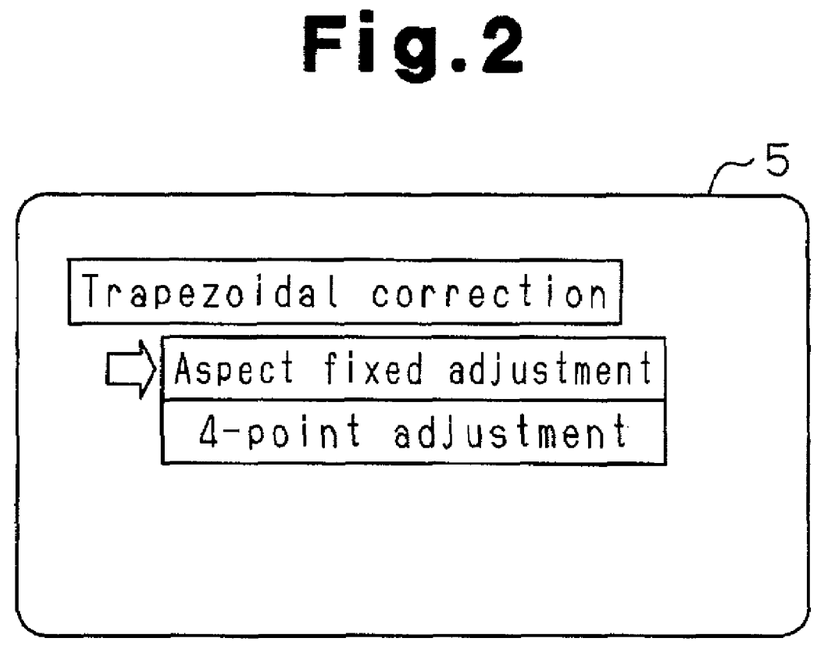
FIG. 2 is a screen shot of an OSD menu displayed when selecting trapezoidal distortion correction.

The video projector 6 is operable in selectable trapezoidal distortion correction process modes. The selectable trapezoidal distortion correction process modes include a trapezoidal distortion correction process that puts emphasis on the aspect ratio and a trapezoidal distortion correction process mode that puts emphasis on the image displayed on the projection surface. The OSD menu is used to guide selection of the correction process mode. FIG. 2 shows one example of an OSD menu displayed on the projection surface 5. The trapezoidal distortion correction process that puts emphasis on the aspect ratio is selected when "Aspect Fixed Adjustment" is selected. The trapezoidal distortion correction process mode that puts emphasis on the image displayed on the projection surface is selected when "4-Point Adjustment" is selected.

Figure 3:
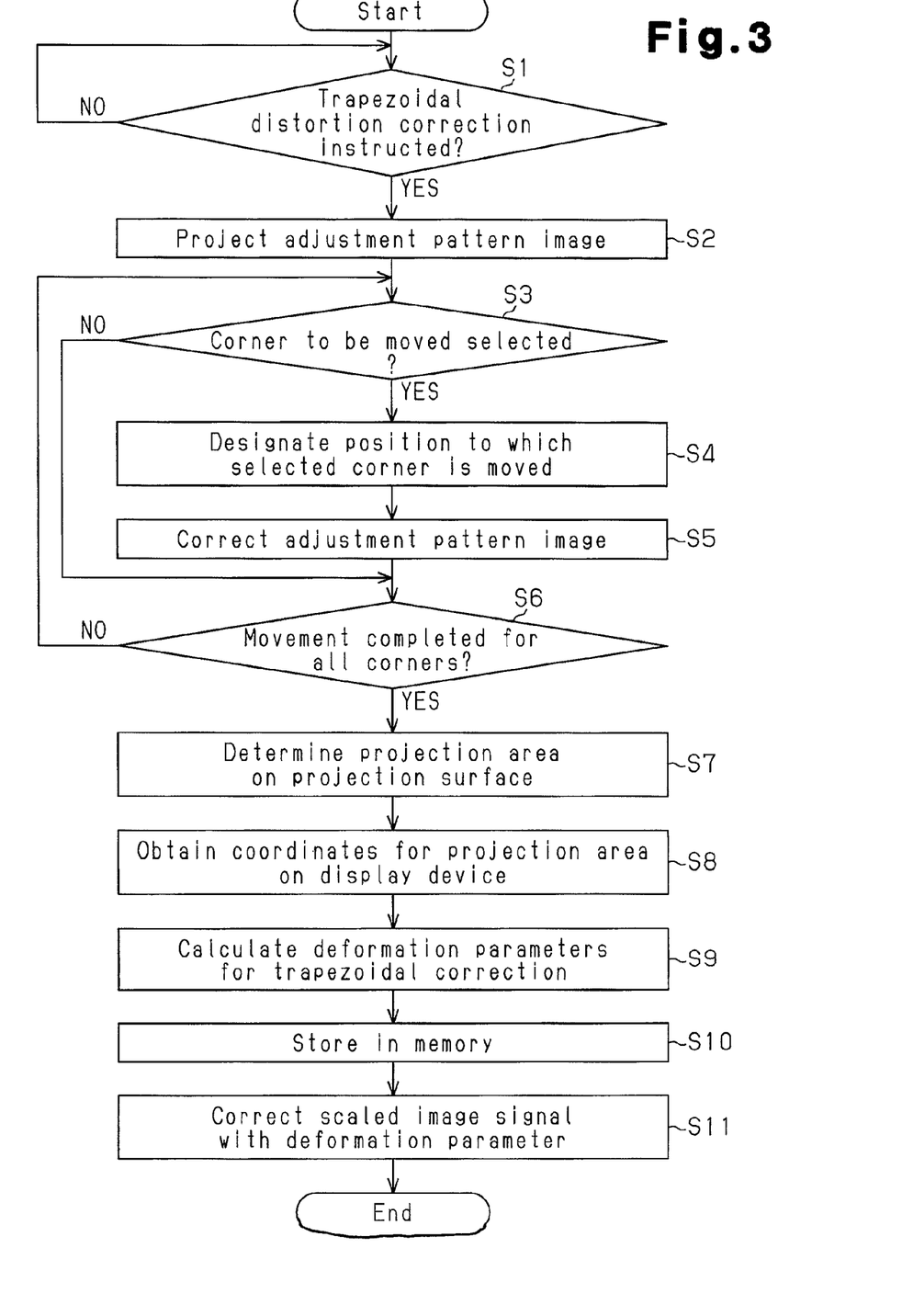
FIG. 3 is a flowchart of a trapezoidal distortion correction process that puts emphasis on the image displayed on the projection surface.
Figure 4A:
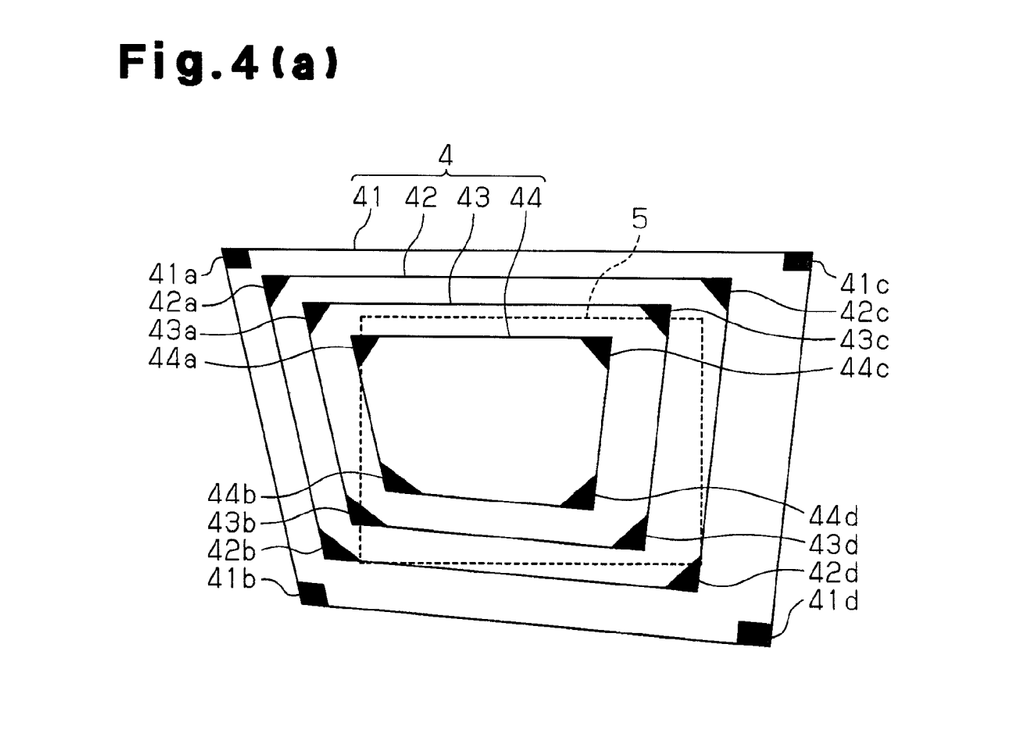
FIG. 4(a) is a diagram showing an adjustment pattern image prior to correction.
Figure 4B:
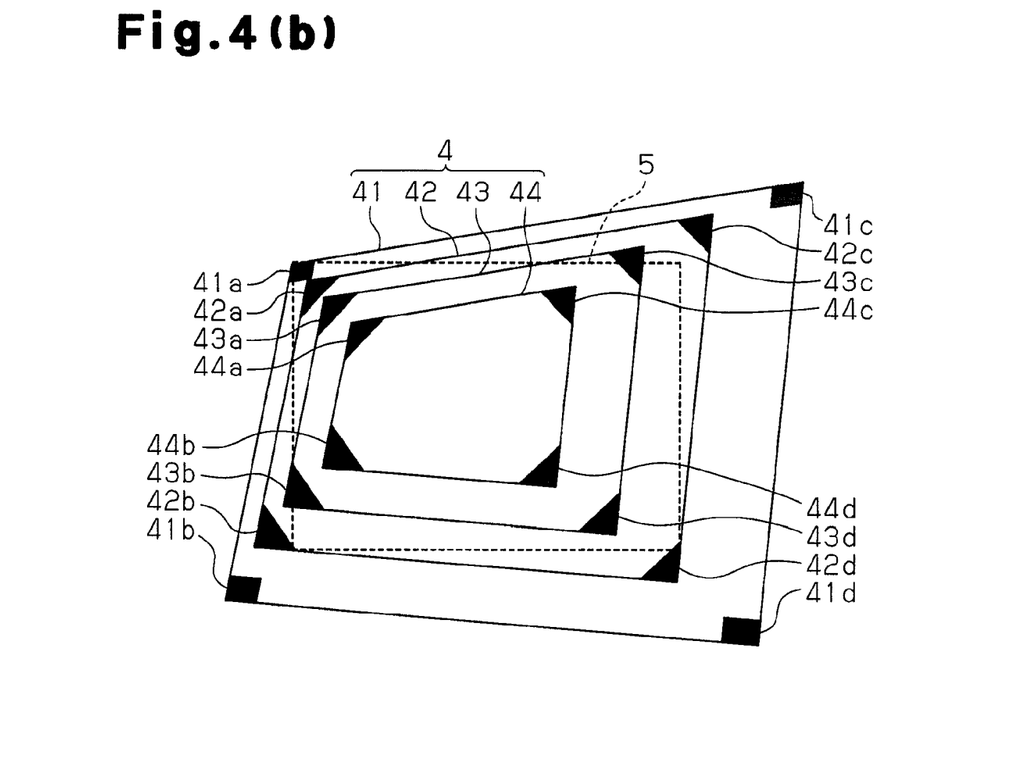
FIG. 4(b) is a diagram showing an adjustment pattern image subsequent to correction of some corner portions.

In these modes, corrections are performed as described in the prior art section. Hereinafter, the features of the present invention which is in the trapezoidal distortion correction process mode that puts emphasis on the image displayed on the projection surface will be discussed with reference to the flowchart of FIG. 3 and the adjustment pattern image shown in FIG. 4. The trapezoidal distortion correction process that puts emphasis on the aspect ratio is performed in the same manner as in the prior art as described above and will not be described here.

First, the video projector 6 waits until the trapezoidal distortion correction process mode is selected. When the trapezoidal distortion correction process that puts emphasis on the aspect ratio is selected (YES in step S1), the adjustment pattern image 4 is projected onto the projection surface 5 (step S2). The adjustment pattern image 4 is generated by the OSD processor 15.

The adjustment pattern image 4 will now be described. Referring to FIG. 4, the adjustment pattern image 4 includes a reference quadrangle pattern 41 and downsized quadrangle patterns 42, 43, and 44. The reference quadrangle pattern 41 corresponds to the entire displayable region 2 of the display device 1 and is displayed as only a frame, only four corner portions 41a to 42d of the frame, or a combination of the frame and four corner portions 41a to 41d. The frame may be referred to as a contour line.

The downsized quadrangle patterns 42, 43, and 44 are of different sizes and are reduced in size in a stepped manner from the reference quadrangle pattern 41. The sizes of the downsized quadrangle patterns 42, 43, and 44 relative to the reference quadrangle pattern 41 are referred to as magnifications. In the illustrated example, the magnifications of the downsized quadrangle patterns 42, 43, and 44 are respectively 0.9, 0.8, and 0.7 times relative to the reference quadrangle pattern 41. The downsized quadrangle patterns 42, 43, and 44 respectively include four corner portions 42a to 42d, 43a to 43d, and 44a to 44d. In this manner, in addition to the reference quadrangle pattern 41, the projector 6 displays the downsized quadrangle patterns 42, 43, and 44, the sizes of which differ in a stepped manner, onto the projection surface S. Even if the reference quadrangle pattern 41 extends out of the projection surface 5, at least one of the downsized quadrangle patterns would be displayed on the projection surface. This enables the presence of the reference quadrangle pattern 41 or a similar shape to be recognized (refer to FIG. 4(a)).

Preferably, the four corner portions 41a to 41d of the reference quadrangle pattern 41 are displayed so that they may be distinguished at a glance from the four corner portions 42a to 42d, 43a to 43d, and 44a to 44d of the downsized quadrangle patterns 42, 43, and 44. For example, the corner portions 41a to 41d of the reference quadrangle pattern 41 may be displayed with a shape or mark that differs from the corner portions 42a to 42d, 43a to 43d, and 44a to 44d of the downsized quadrangle patterns 42, 43, and 44. In the illustrated example, rectangular marks represent the corner portions 41a to 41d of the reference quadrangle pattern 41, and triangular marks represent the corner portions 42a to 42d, 43a to 43d, and 44a to 44d of the downsized quadrangle patterns 42, 43, and 44. Although not shown in the drawings, instead of changing the shapes or marks, the corner portions 41a to 41d of the reference quadrangle pattern 41 may be displayed in a color that differs from that of the corner portions 42a to 42d, 43a to 43d, and 44a to 44d of the downsized quadrangle patterns 42, 43, and 44. Alternatively, a different color may be used for each of the quadrangle patterns 41 to 44 to display the corner portions.

Trapezoidal distortion may occur in the adjustment pattern image 4 displayed on the projection surface 5. A process for correcting such trapezoidal distortion will now be discussed. The trapezoidal distortion corrector 16 performs the correction process.

In accordance with an operation menu and operation procedures displayed on the projection surface 5 such as a screen, the four corner portions 41a to 41d of the distorted reference quadrangle pattern 41 are moved to locations substantially corresponding to the four corner portions of the projection surface 5. Alternatively, the corner portions 41a to 41d may be moved to locations corresponding to the four corner portions of a rectangle in the projection surface. In a non-limiting example, the four corner portions are moved in the order of upper left corner portion, lower left corner portion, upper right corner portion, and lower right corner portion. In the example shown in FIG. 4(b), the vertex of the upper left corner portion 41a in the distorted reference quadrangle pattern 41 is located on the upper left corner of the projection surface 5.

To move the corner portions 41a to 41d of the reference quadrangle pattern 41, the one of the corner portions 41a to 41d that is to be moved is selected (step S3). To explicitly display the selected corner portion (e.g., 41a) so as to avoid operation errors, the selected corner portions is displayed with a color or mark that differs from the other corner portions that are not undergoing correction (e.g., 41b to 41d). This distinguishes the corner portion that is undergoing correction from the other corner portions.

Then, the position to which each of the corner portions 41a to 41d in the reference quadrangle pattern 41 is moved is designated on the projection surface 5 (step S4). In accordance with the designation, the OSD processor 15 corrects the four corner portions of the adjustment pattern image 4 (step S5). When movement of the four corner portions 41a to 41d of the reference quadrangle pattern 41 is instructed, the corner portions 42a to 42d, 43a to 43d, and 44a to 44d of the downsized quadrangle patterns 42, 43, and 44 that correspond to the corner portions 41a to 41d are also moved in cooperation with the movement of the corner portions 41a to 41d of the reference quadrangle pattern 41. In this case, the predetermined magnifications, which determine the size of the frames, remain the same for the downsized quadrangle patterns 42, 43, and 44.

When movement of the corner portions 41a to 41d in the reference quadrangle pattern 41 is completed, and correction for displaying the reference quadrangle pattern 41 as a predetermined rectangle is confirmed (YES in step S6), the projection area 7 on the projection surface 5 is determined (step S7). Further, the coordinates for a projection area 7 in the coordinate axes of the displayable region 2 on the display device 1 are obtained (step S8). In accordance with the coordinates, the control processing unit 19 calculates deformation parameters for trapezoidal distortion correction (step S9) and stores the calculated deformation parameters in the memory 18 added to the trapezoidal distortion corrector 16 (step S10). The trapezoidal distortion corrector 16 uses the deformation parameter to perform a correction process on the image signal processed by the scaling processor 12 (step S11). This completes the trapezoidal distortion correction process.

In the correction process described above, if there is enough space in the projection surface 5 and the offset region 3 of the display device 1, a digital shift process may be performed to shift the determined projection area 7 in the same manner as in the prior art. In this case, the deformation parameters are calculated based on the shifted projection area 7 so as to correct the image signal processed by the scaling processor 12 based on the deformation parameters.

(1) The adjustment pattern image 4 used in the trapezoidal distortion correction process mode that puts emphasis on the image displayed on the projection surface includes the reference quadrangle pattern 41, which has four corner portions, and the downsized quadrangle patterns 42, 43, and 44, which are of different sizes. The reference quadrangle pattern 41 and the downsized quadrangle patterns 42, 43, and 44 have the same shape as the displayable region 2 on the display device 1. The magnification relative to the reference quadrangle pattern 41 is 1 or less for each of the downsized quadrangle patterns 42, 43, and 44, which has the same shape as the reference quadrangle pattern 41. Thus, even if the reference quadrangle pattern 41 extends out of the projection surface 5 when performing trapezoidal distortion correction, at least one of the downsized quadrangle patterns 42, 43, and 44 is displayed on the projection surface 5. This allows the location of the reference quadrangle pattern 41 to be predicted. Therefore, the presence of the adjustment pattern image 4 can be confirmed, and the shape of the adjustment pattern image 4 can be confirmed.

(2) The OSD processor 15 is configured to discretely correct the four corner portions of the adjustment pattern image 4 in any order on the projection surface 5. This enables the user to perform the operations for adjusting the projection area 7 without being confused.

(3) A corner portion of the adjustment pattern image 4 that is being corrected is displayed differently from corner portions that are not being corrected. This allows the user to easily distinguish the corner portion that is being corrected. Thus, the user can perform trapezoidal distortion correction without being confused. If the corner portion that is being corrected is displayed with a color that differs from the corner portions that are not being corrected, the corner portions would be distinguished with further ease.

(4) In the adjustment pattern image 4, the corner portions 41a to 41d of the reference quadrangle pattern 41 are displayed differently from the corner portions 42a to 42d, 43a to 43d, and 44a to 44d of the downsized quadrangle patterns 42, 43, and 44. This reduces recognition errors of the reference quadrangle pattern 41 and the downsized quadrangle patterns 42, 43, and 44. In this case, the corner portions 41a to 41d are displayed with a shape or mark that differs from the corner portions 42a to 42d, 43a to 43d, and 44a to 44d. This further reduces recognition errors of the reference quadrangle pattern 41 and the downsized quadrangle patterns 42, 43, and 44.

(5) When performing trapezoidal distortion correction, the OSD menu screen displayed on the projection surface 5 guides the user. Thus, the user needs to view only the projection surface 5 to perform correction operations. This reduces errors in the correction procedures.

(6) Trapezoidal distortion correction may be performed by selecting the trapezoidal distortion correction process mode that puts emphasis on the aspect ratio or the trapezoidal distortion correction process mode that puts emphasis on the image displayed on the projection surface. If the adjustment direction is known when eliminating distortion, the user may select the trapezoidal distortion correction process mode that puts emphasis on the aspect ratio. This facilitates trapezoidal distortion correction.

It should be apparent to those skilled in the art that the present invention may be embodied in many other specific forms without departing from the spirit or scope of the invention. Particularly, it should be understood that the present invention may be embodied in the following forms.

The corner portions of the adjustment pattern image 4 do not have to be displayed with triangles or tetragons, and the adjustment pattern image 4 does not have to be displayed by a contour line. The corner portions do not have to be displayed with triangles or tetragons to be distinguishable and may be displayed to be round or key-shaped. These marks may be shadowed or non-shadowed. For example, the corner portion that is being adjusted may be displayed with shadowed mark, and the corner portions that are not being adjusted may be displayed with non-shadowed marks.

The selection of the trapezoidal distortion correction process mode and the operations for moving the trapezoidal distortion pattern image in the trapezoidal distortion correction mode oriented to the image displayed on the projection surface are performed in accordance with the OSD display. However, such processing may be performed by operating the operation unit 20 formed on the remote controller or main body.

The video projector 6 is not limited to a three-chip LCD video projector and may be an LCD video projector that includes other image light generation systems.

In the preferred embodiment, the video projector 6 is not limited to a three-chip LCD video projector that uses an LCD panel serving as an optical modulation element and may be a projection type video projector including other types of image light generation systems. For example, the present invention may be applied to a video projector for digital light processing (DLP, registered trademark of Texas Instruments (TI)).

The video projector according to the present invention may be used in various types of facilities, such as home theaters, conference rooms, classrooms, training rooms, amusement halls, exhibition halls, and studios.

The present examples and embodiments are to be considered as illustrative and not restrictive, and the invention is not to be limited to the details given herein, but may be modified within the scope and equivalence of the appended claims.

What is claimed is:

1. A video projector comprising:
   a display device that receives an image signal, performs optical modulation on light emitted from a light source based on the image signal, and generates optically modulated image light to be projected onto a projection surface;
   a scaling processor that performs a scaling process on the input image signal;
   an on-screen display (OSD) processor that generates an adjustment pattern image and corrects the adjustment pattern image in accordance with a correction instruction on the projection surface;
   an image signal synthesizer that combines the image signal processed by the scaling processor with an OSD image signal generated and corrected by the OSD processor to generate a combined image signal; and
   a trapezoidal distortion corrector that performs trapezoidal distortion correction on the combined image signal from the image signal synthesizer based on the correction of the adjustment pattern image on the projection surface;
   wherein the adjustment pattern image generated by the OSD processor includes:
      a reference quadrangle pattern having the same shape as a displayable region on the display device and including four corner portions; and
      a plurality of downsized quadrangle patterns of different sizes, in which the downsized quadrangle patterns are reduced in size from the reference quadrangle pattern by a magnification of one or less, and
      wherein the reference quadrangle pattern and the plurality of downsized quadrangle patterns of different sizes are simultaneously projected on said projection surface.

2. The video projector according to claim 1, wherein the OSD processor is configured to allow positions of the four corner portions of the adjustment pattern image to be corrected in any order on the projection surface.

3. The video projector according to claim 1, wherein the adjustment pattern image is formed so that a corner portion that is being corrected is displayed differently from the other corner portions.

4. The video projector according to claim 3, wherein the adjustment pattern image is formed so that a corner portion that is being corrected is displayed in a color that differs from the other corner portions.

5. The video projector according to claim 1, wherein the adjustment pattern image is formed so that the corner portions of the reference quadrangle pattern are displayed differently from the corner portions of the downsized quadrangle patterns.

6. The video projector according to claim 5, wherein the adjustment pattern image is formed so that the corner portions of the reference quadrangle pattern are displayed with a shape or mark that differs from the corner portions of the downsized quadrangle patterns.

7. The video projector according to claim 1, wherein the trapezoidal distortion corrector is selectively operable in a mode for performing the trapezoidal distortion correction and a mode for performing a trapezoidal distortion correction in a horizontal direction or a vertical direction so as to maintain a constant aspect ratio.

8. The video projector according to claim 1, wherein the trapezoidal distortion correction is performed based on an operation instruction displayed on the projection surface.

* * * * *

UNITED STATES PATENT AND TRADEMARK OFFICE
CERTIFICATE OF CORRECTION

PATENT NO. : 8,162,487 B2
APPLICATION NO. : 12/433230
DATED : April 24, 2012
INVENTOR(S) : Kenji Ofune et al.

It is certified that error appears in the above-identified patent and that said Letters Patent is hereby corrected as shown below:

On the cover page, in the left column, line (75) should read

-- (75)   Inventors:   Kenji Ofune, Higashi Osaka-shi (JP); Naoki
Kaise, Highashi Osaka-shi (JP) --

Signed and Sealed this
Seventeenth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,162,487 B2
APPLICATION NO. : 12/433230
DATED : April 24, 2012
INVENTOR(S) : Kenji Ofune et al.

Page 1 of 1

It is certified that error appears in the above-identified patent and that said Letters Patent is hereby corrected as shown below:

On the title page, in the left column, line (75) should read

-- (75) Inventors: Kenji Ofune, Higashi Osaka-shi (JP); Naoki Kaise, Higashi Osaka-shi (JP) --

This certificate supersedes the Certificate of Correction issued July 17, 2012.

Signed and Sealed this
Twenty-third Day of April, 2013

Teresa Stanek Rea
*Acting Director of the United States Patent and Trademark Office*